(12) United States Patent
Araujo (10) Patent No.: US 9,223,596 B1
(45) Date of Patent: Dec. 29, 2015

(54) VIRTUAL MACHINE FAST PROVISIONING BASED ON DYNAMIC CRITERION

(71) Applicant: GOOGLE INC., Mountain View, CA (US)

(72) Inventor: Nelson Araujo, Redmond, WA (US)

(73) Assignee: GOOGLE INC., Mountain View, CA (US)

( * ) Notice: Subject to any disclaimer, the term of this patent is extended or adjusted under 35 U.S.C. 154(b) by 392 days.

(21) Appl. No.: 13/715,077

(22) Filed: Dec. 14, 2012

Related U.S. Application Data (60) Provisional application No. 61/581,362, filed on Dec. 29, 2011.

(51) Int. Cl.
| | |
|---|---|
| G06F 9/455 | (2006.01) |
| G06F 9/46 | (2006.01) |
| G06F 15/177 | (2006.01) |
| G06F 15/173 | (2006.01) |
| G06F 9/44 | (2006.01) |

(52) U.S. Cl.
CPC .............. *G06F 9/455* (2013.01); *G06F 9/4401* (2013.01)

(58) Field of Classification Search
None
See application file for complete search history.

(56) References Cited

U.S. PATENT DOCUMENTS 7,577,722 B1 * 8/2009 Khandekar et al. ........... 709/220

* cited by examiner

*Primary Examiner* — Meng An
*Assistant Examiner* — Bing Zhao
(74) *Attorney, Agent, or Firm* — Birch, Stewart, Kolasch & Birch, LLP (57) ABSTRACT

Disclosed herein are methods and systems for reducing the loading time of virtual machines. A virtual machine is booted on a virtual machine host. The machine continues to initialize until it has reached a ready-state. The machine is then paused on the virtual machine host. A request for the virtual machine may then be received from a client. The machine is then resumed on the virtual machine host and a notification may be sent to the client stating that the machine is ready.

9 Claims, 5 Drawing Sheets

VIRTUAL MACHINE FAST PROVISIONING BASED ON DYNAMIC CRITERION

CROSS-REFERENCE TO RELATED APPLICATIONS

This application claims the benefit of U.S. Provisional Appl. No. 61/581,362, filed Dec. 29, 2011 which is herein incorporated by reference.

BACKGROUND

1. Field

Embodiments relate to the field of virtual machines.

2. Background

Virtual machines are increasingly being used to allow for more efficient use of physical computing resources. However, similarly to physical computing devices, virtual machines take a period of time to initialize and become ready for use. In an environment where computing resources are required to be quickly available, this time period for initialization may not be desirable.

BRIEF SUMMARY

Embodiments include methods and systems for quick provisioning of virtual machines. In an embodiment, a virtual machine is booted on a virtual machine host. It is determined when the virtual machine has reached a ready-state based upon a criteria. The virtual machine is paused based upon the determination of the ready-state, wherein the pausing includes placing the virtual machine in an inactive state on the virtual machine host. A request for the virtual machine is received from a client while the virtual machine is paused. The virtual machine is resumed on the virtual machine host in response to the request from the client. A notification is sent to a client, wherein the notification specifies that the virtual machine is ready for use.

Further embodiments, features, and advantages of the invention, as well as the structure and operation of the various embodiments of the invention, are described in detail below with reference to accompanying drawings.

BRIEF DESCRIPTION OF THE DRAWINGS/FIGURES

Embodiments of the invention are described with reference to the accompanying drawings. In the drawings, like reference numbers may indicate identical or functionally similar elements. The drawing in which an element first appears is generally indicated by the let-most digit in the corresponding reference number.

DETAILED DESCRIPTION

While the present invention is described herein with reference to the illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

In the detailed description of embodiments that follows, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Virtual machines are software implemented versions of computing devices. The resources used in a virtual machine, however, correspond to physical resources on a computing device. For example, a one or more processors in a virtual machine may correspond to one or more real processors on a real computer. However, this may not be a 1:1 relationship. The ability to create software implemented versions of computers may allow for several virtual machines to operate on the same physical computer. This may be desirable because it allows for conservation of resources on a physical computer. When one or more virtual machines are inactive, one or more other virtual machines may be active, and thus, the use of virtual machines may allow for better utilization of the physical resources of a computer.

Figure 1:
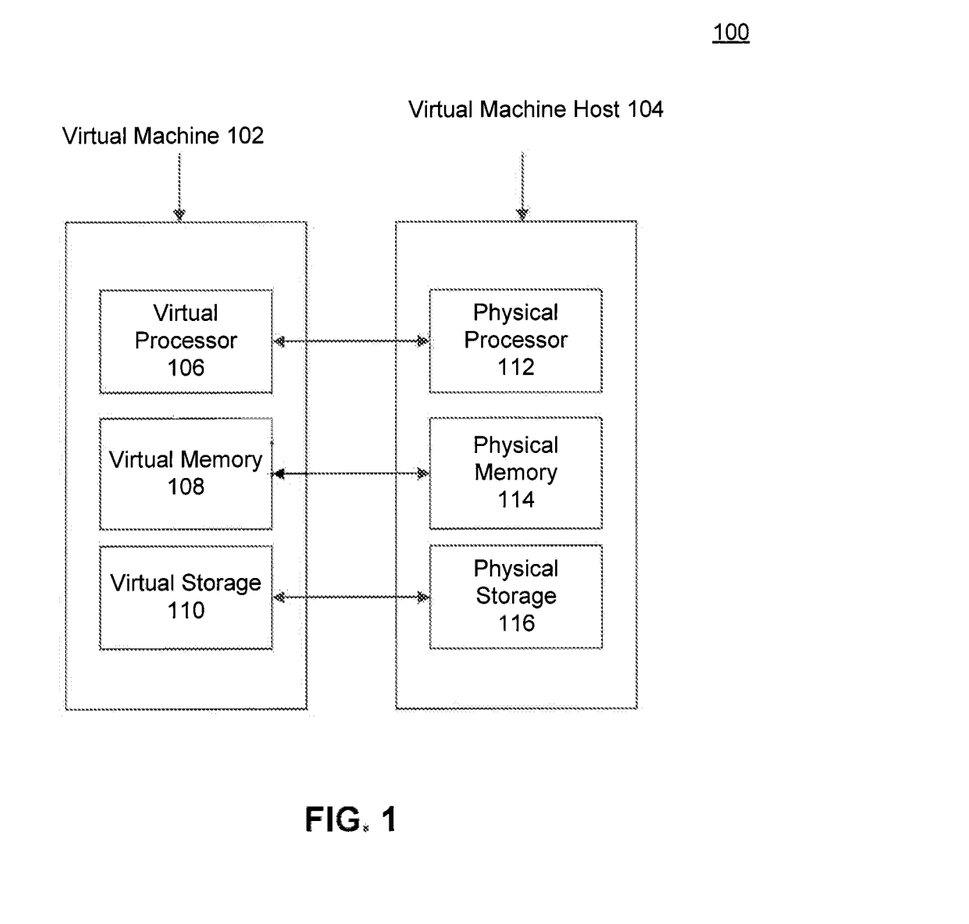
FIG. 1 is a diagram of a virtual machine architecture that may be used in an embodiment of the present invention.

FIG. 1 is a diagram of a virtual machine architecture that may be used in an embodiment of the present invention.

Virtual machine architecture 100 includes a virtual machine 102 and a virtual machine host 104. Virtual machine 102 includes a virtual processor 106, virtual memory 108, and virtual storage 110. Virtual machine 102 may be a software implemented version of a computer. Virtual machine 102 may also include a variety of other virtual devices that correspond to physical devices. For example, virtual machine 102 may include devices such as a virtual sound card, a virtual network interface, and virtual USB devices. Virtual machine 102 may also have an associated configuration that specifies the hardware and software parameters of virtual machine 102. The virtual machine configuration may specify the number and type of processors, the amount of memory, the amount of storage, and the operating system that virtual machine 102 may have. The configuration may further specify how the virtual resources map to physical resources. For example, virtual machine 102 may have corresponding physical resources in virtual machine host 104.

Virtual machine host 104 may be responsible for executing and managing virtual machine 102. This may be done through software referred to as a hypervisor. The hypervisor may be responsible for managing and executing the virtual machines and providing the mapping between virtual resources and physical resources. A hypervisor may be installed on virtual machine host 104. However, in some cases, virtual machine computer architecture 100 may be more decentralized. For example, virtual machine host 104 may instead be responsible for only managing and providing access to virtual machine 102, while other hosts are responsible for executing and providing resources to virtual machine 102. Virtual machine host 104 may also include physical resources that the virtual machine may need to operate. However, those resources may also be spread across multiple hosts. Virtual machine host 104 may also contain more than one virtual machine such that multiple virtual machines are running simultaneously on virtual machine host 104.

Virtual processor 106 may be configured to act as a central processing unit (CPU) for virtual machine 102. Accordingly, any processes that run within virtual machine 102 may only be aware of virtual processor 106. However, virtual processor 106 may have a corresponding physical processor 112. Thus, any time virtual processor 106 is asked to do a unit of work, it may relay that unit of work to physical processor 112, such that physical processor 112 does the processing. This may occur via software mechanisms that are able to relay instructions from virtual processor 106 to physical processor 112, or directly through hardware mechanisms that physical processor 112 may have. For example, some types of processors natively support virtualization. In such cases, virtual machine 102 may be able to pass instructions directly to physical processor 112.

Any time a process in virtual machine 102 needs the use of memory to store temporary data, the process may store the temporary data in virtual memory 108. However, virtual memory 108 may correspond to a reserved space in physical memory 114. This space may be contiguous or noncontiguous. Thus, any time a process in virtual machine 102 needs to use virtual memory 108, that data may be stored in the corresponding reserved part or parts of physical memory 114. Physical memory 114 may be random access memory, or any other type of persistent or volatile storage device. Virtual machine 102 also includes virtual storage 110. Virtual storage 110 may be used for any of the permanent storage that virtual machine 102 may need. Virtual storage 110 may correspond to one or more image files on physical storage 116. These files may represent an image of a hard drive. However, in some cases, parts or all of virtual storage 110 may first be cached in physical memory 114 before being written to one or more files on physical storage 116. Thus, when virtual machine 102 is initialized, the one or more files may be read from physical storage 116 and loaded such that virtual machine 102 recognizes the one or more files as a persistent storage device. Virtual machines 102 may also implement other functions that a physical computing device would implement, such as sleep or suspend mode.

Typically, when a physical computing device enters sleep or suspend mode, the computing device outputs the contents of memory to a persistent storage device, such as physical storage 116. The physical computing device may also output the state of the processor to a persistent storage device. For example, the processor cache state and register state may be saved onto the persistent storage device. The physical computing device may then enter a low-power mode or turn off. When the physical computing device exits suspend mode, or resumes, the physical computing device reads the contents of the memory from the persistent storage device, loads the contents back into physical memory, and sets the state of the CPU using the saved CPU state. Similarly to a physical computing device, virtual machine 102 may also implement sleep or suspend mode. Virtual machine 102 may operate by saving the contents of virtual memory 108 and the state of virtual processor 106 to a persistent storage device. In the case of a virtual machine 102, the persistent storage device may be virtual storage 110. Virtual storage 110 also corresponds to one or more files on physical storage 116. Similarly to a physical computing device, when virtual machine 102 is resumed, the contents of virtual memory 108 and the CPU state may be read from virtual storage 110 and physical storage 116, respectively.

Virtual machine host 104 may also implement a sleep or suspend mode for virtual machine 102. In such a case, virtual machine host 104 may pause virtual machine 102 and save the contents of virtual memory 108 and the CPU state to a persistent storage device, such as physical storage 116. After the contents and state have been saved to a persistent storage device, virtual machine host 104 may terminate virtual machine 102 by removing virtual machine 102 from physical memory 114. In such a case, virtual machine 102 may not even have knowledge that it has been suspended. For example, virtual machine's 102 clock may remain frozen at the time right before virtual machine 102 was suspended. When virtual machine 102 is resumed, virtual machine host 104 reads the contents of the memory from the persistent storage device, loads the contents back into virtual memory 108, and sets the state of the virtual processor 106 using the saved CPU state. However, loading the contents of memory and the CPU state from a persistent storage device, also referred to as provisioning, takes a period of time that may depend on the size of virtual memory 108, and the speed of physical memory 114 and physical storage 116.

There are many types of architectures for virtual machines, including virtual machine architecture 100. A person having skill in the art would recognize that there are a number of other different architectures for virtual machines, and the methods and systems disclosed herein may be adapted to work on any of these architectures.

Figure 2:
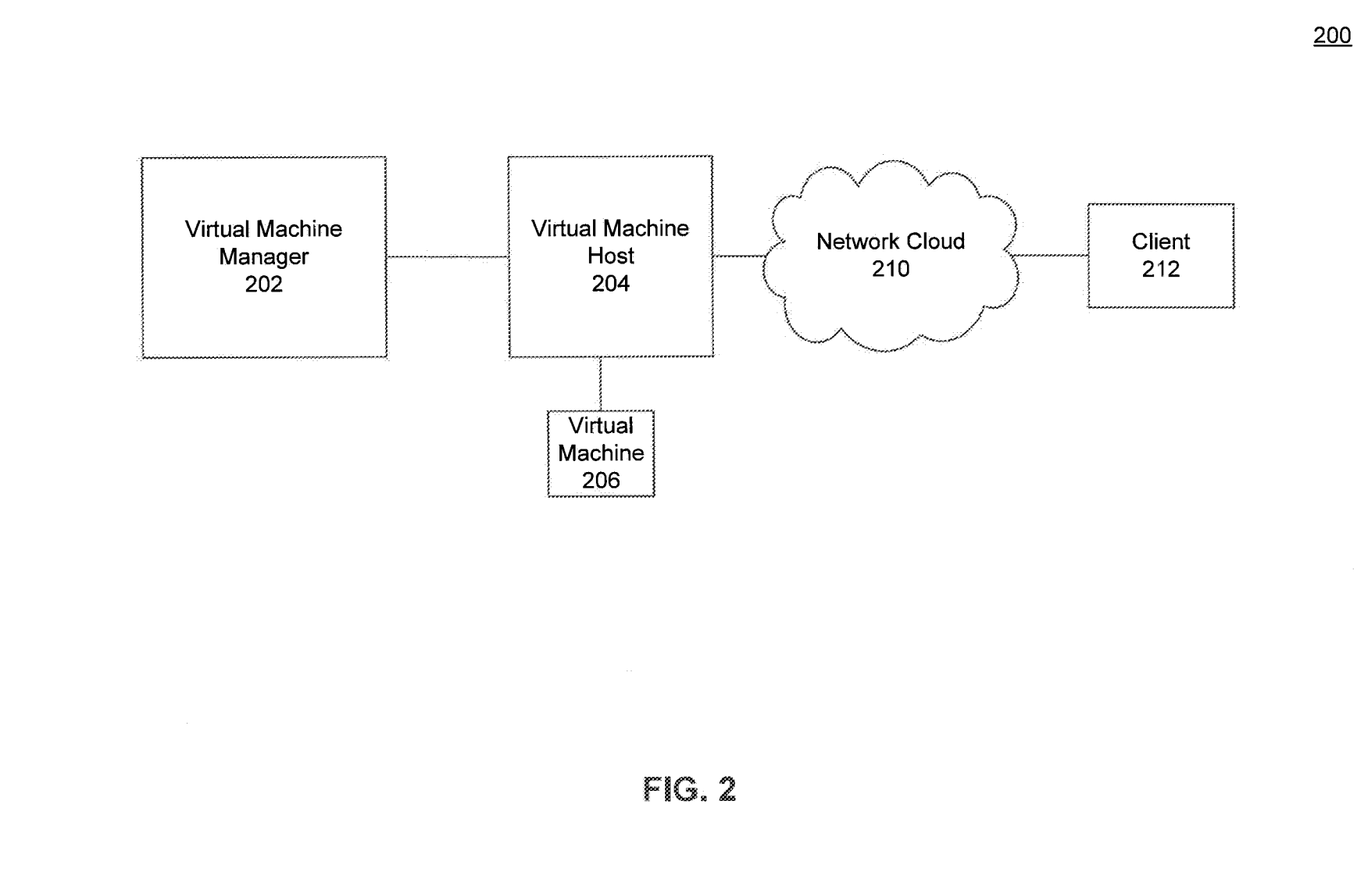
FIG. 2 is a block diagram of a system for virtual machine fast provisioning, according to an embodiment.

FIG. 2 is a block diagram of a system for virtual machine fast provisioning, according to an embodiment. System 200 includes a virtual machine manager 202, a virtual machine host 204, a virtual machine 206, and a client 212. In an embodiment, virtual machine host 204 is a computing device configured to host and execute virtual machine 206. However, in another embodiment, virtual machine 206 is executed on a different computing device than virtual machine host 204, and virtual machine host 204 may only be responsible for managing and providing access to virtual machine 206. The physical resources required by virtual machine 206 may be located inside of virtual machine host 204. However, the resources may also be spread throughout a number of different physical computing devices.

Client 212 is a computing device configured to request access to virtual machine 206 from virtual machine host 204. Client 212 may be any type computing device such as a personal computer, server, or mobile device. Client 212 communicates with virtual machine host 204 through a network 210. Network 210 may be a local area network, a wide-area network, or both. Client 212, by gaining access to virtual machine 206, may be able to use virtual machine 206 as if it were a physical computer. For example, client 212 may be able to perform a variety of tasks, such as running processes on virtual machine 206, or receiving results or statuses of processes that were already configured to run on virtual machine 206 through its configuration. Once client 212 requests access to virtual machine 206, virtual machine host 204 may determine whether virtual machine 206 is ready for use, and notify client 212 once virtual machine 206 is ready for use. The notification may include information such as virtual machine's 206 interne protocol (IP) address, status information, configuration information, or other information that may be needed to access virtual machine 206.

System 200 also includes a virtual machine manager 202. Virtual machine manager 202 may be configured to manage the provisioning of virtual machine 206. When virtual machine host 204 is initialized, virtual machine manager 202 may be configured to initialize virtual machine 206. However, in some cases, virtual machine manager 202 may wait for a signal to initialize virtual machine 206. Virtual machine manager 202 may be further configured to determine a ready-state of virtual machine 206. The ready-state of virtual machine 206 may be described by criteria that defines when virtual machine 206 is considered to be ready for use. In particular, the ready-state criteria may define a point at any time during the initialization or execution of virtual machine 206. The ready-state criteria may also be predetermined or set dynamically. For example, the ready-state may be a predefined point, such as when the operating system presents a login screen or after a particular process or program has been started on virtual machine 206. However, the ready-state criteria may also be determined dynamically through a series of conditions that may be met in which virtual machine 206 may be considered ready. For example, a certain number of connections made to virtual machine 206, or a certain load on the CPU may determine the ready-state. As a result, the ready-state of any particular virtual machine may be different depending on the circumstances and the needs of the client.

After virtual machine manager 202 has determined that virtual machine 206 has reached its ready-state, virtual machine manager 202 may pause virtual machine 206. When virtual machine 206 is paused, virtual machine 206 may become inactive, such that virtual machine 206 is no longer using any processor time on virtual machine host 204. However, when virtual machine 206 is paused, the rest of virtual machine's 206 resources may still remain loaded on virtual machine host 204. As a result, the resources of virtual machine 206 may not need to be reloaded when virtual machine 206 is resumed. For example, when virtual machine 206 is resumed, the contents of virtual machine's 206 memory may not need to be reloaded, since the memory contents may still loaded in virtual machine host's 204 physical memory.

The particular ready-state that is selected for virtual machine 206 may be based, in some cases, upon virtual machine's 206 particular configuration and the availability of virtual machine host's 204 resources. For example, when virtual machine 206 is paused, it may still remain in virtual machine host's 204 memory. Depending on the amount of memory and the number of other virtual machines running on virtual machine host 204, this may be undesirable. In particular, virtual machine 206 may be configured with an operating system having a large memory footprint. In such a case, the large memory footprint may take up a large amount of physical memory on virtual machine host 204, even while paused. As a result, in such a case, the ready-state may be configured to be a state prior to the loading of the operating system so that when virtual machine 206 is paused, virtual machine 206 does not require a large amount of physical memory on virtual machine host 204. In other cases, virtual machine 206 may be configured to start processes with particularly large memory footprints, such as databases. In such a case, the ready-state may be a state prior to the loading of certain services but after the operating system is loaded.

Virtual machine manager 202 may maintain virtual machine 206 as paused until virtual machine host 204 receives a request from client 212 for access to virtual machine 206. Once virtual machine host 204 receives a request for access to virtual machine 206, virtual machine manager 202 may resume virtual machine 206, such that virtual machine 206 is active on virtual machine host 204. However, because virtual machine 206 may be paused at its ready-state instead of turned off, virtual machine's 206 resources may already be loaded on virtual machine host 204. Thus, virtual machine 206 may be quickly ready for use. After virtual machine 206 has been resumed, virtual machine host 204 may perform some final configuration tasks, such as synchronizing virtual machine's 206 data with any data that has changed while virtual machine 206 was paused. Once the final configuration has completed, a notification that virtual machine 206 is ready may be sent to client 212.

In an embodiment, system 200 contains more than one virtual machine. The virtual machines may be in a virtual machine pool. Each of these virtual machines may have a particular configuration. The configuration may include a variety of settings, such as number of processors, amount of memory, operating system type, and installed software applications. For example, one virtual machine may have one operating system type and another virtual machine may have the same or a different operating system type. The virtual machines may also be configured with different applications. For example, one virtual machine may have the same operating system type as another virtual machine but different applications installed. One virtual machine may also be configured with the same applications as another virtual machine, but a different operating system type. A person having skill in the art would recognize that the configuration may also include a number of other settings depending on the context. Client 212 may be further configured to request a particular type of configuration from virtual machine host 204. The requested configuration may include any feature or setting related to either software or hardware that a virtual machine may be configured with. For example, client 212 may request a virtual machine with any combination of a particular operating system type, a particular file or a group of files, a particular application or set of applications, a particular hardware device or setting, or any other feature or setting.

Virtual machine manager 202 may be configured to initialize each of the virtual machines in the virtual machine pool to their respective ready-states. However, the ready-state may be set for some of the virtual machines such that the ready-state occurs prior to the loading of the operating system. This may enable for the operating system to be changed dynamically based upon a requested configuration. For example, client 212 may send a request for a particular virtual machine configuration having a specific operating system type. This may cause virtual machine manager 202 to search the virtual machine pool for a matching virtual machine. However, the virtual machine pool may have a virtual machine at a ready-state that matches the requested hardware configuration, but with a different operating system. If the ready-state is a state prior to the operating system being loaded, virtual machine manager 202 may switch out the operating system software image for the requested software image. Thus, virtual machine manager 202 may be configured to allow for dynamic selection of an operating system while still providing a faster initialization time for a virtual machine.

Virtual machine manager 202 may also be configured to search the virtual machine pool for virtual machines that match a superset of the requested configuration from client 212. For example, in some cases, the requested hardware and software configurations may be just a minimum required by client 212. In such cases, a matching virtual machine may be a superset of the hardware configuration, the software configuration, or both. For example, client 212 may request a virtual machine with four gigabytes of memory and two processors, but the virtual machine pool may only have available virtual machines with eight gigabytes of RAM and four processors. Depending on the context, the virtual machine with eight gigabytes and four processors may be suitable to client 212. Similarly, the software configuration may be a superset of the requested software configuration. For example, the requested version of the operating system may be lower or older than any of the virtual machines available in the virtual machine pool. However, in some cases, using a higher or newer version number may be suitable to client 212. If the superset is not suitable to client 212, the located virtual machine may be sliced in some circumstances in order to create a suitable virtual machine. For example, if a virtual machine is located with eight gigabytes of memory, but the client 212 needs a virtual machine with four gigabytes of memory, the virtual machine manager 202 may slice the configuration of the virtual machine with eight gigabytes memory to only have four gigabytes of memory. The remaining four gigabytes of memory sliced away may then be kept for later use by the virtual machine or freed such that the memory may be used by other virtual machines.

Figure 3:
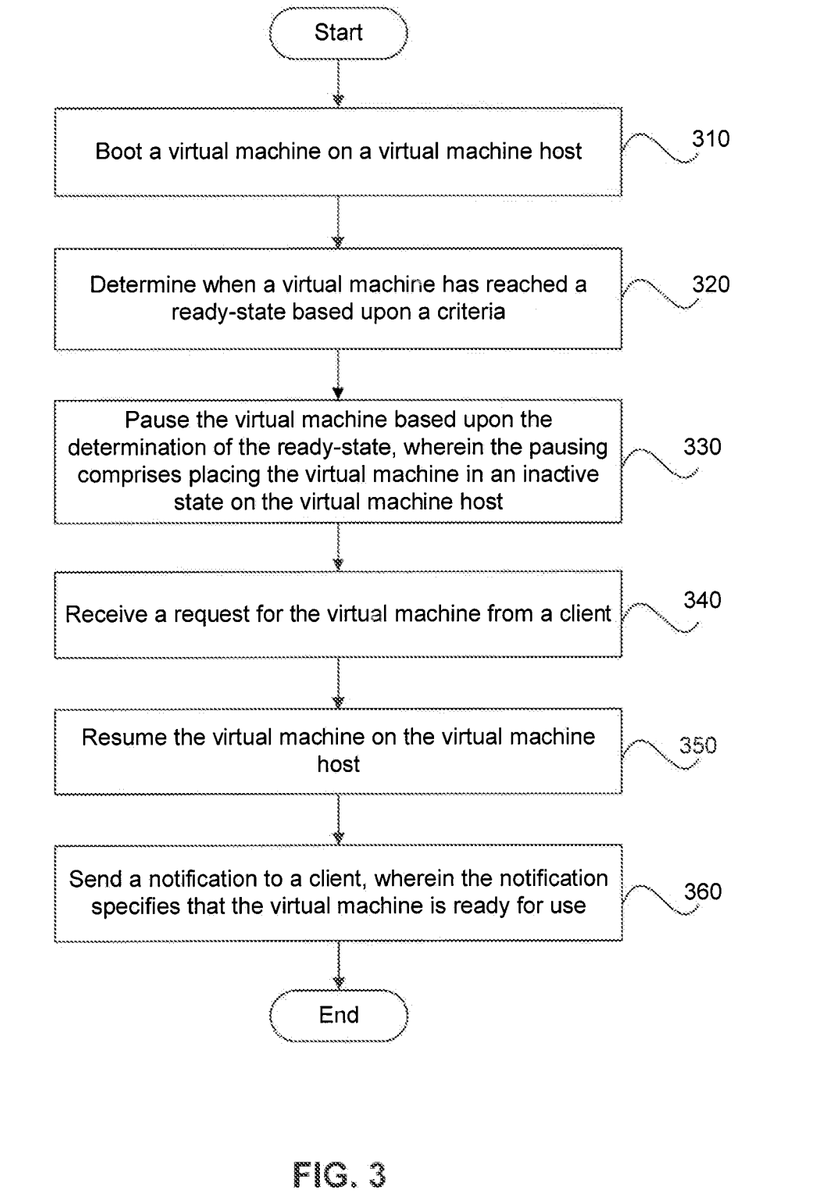
FIG. 3 is a flow diagram for a method of fast provisioning virtual machines, according to an embodiment.

FIG. 3 is a flow diagram for a method of fast provisioning virtual machines, according to an embodiment. At block 310 of method 300, a virtual machine is booted on a virtual machine host. For example, virtual machine 206 may be booted on virtual machine host 204. The virtual machine host may be a single computing device or more than one computing device. The virtual machine may have a particular hardware configuration and a software configuration. The hardware configuration may specify the particular hardware the virtual machine is configured with, such as the number and types of processors, amount of memory, and amount of storage. The software configuration may specify the hard drive or software image the virtual machine may load. This image may be a particular operating system configured with a particular set of applications. The virtual machine hardware may also correspond to hardware on the virtual machine host or hardware spread among several computing devices. The virtual machine may be booted in a manner similar to a physical computer, however, the commands may instead be processed by the virtual hardware of the virtual machine. However, any commands processed by virtual hardware are eventually or directly processed by corresponding physical hardware.

At block 320, a virtual machine is determined to have reached a ready-state based upon a criteria. For example, virtual machine manager 202 may determine whether virtual machine 206 has reached its ready-state. The ready-state may be a state in which the virtual machine is ready to be used by a particular user or client. The ready-state may be different based upon the context and the needs of a particular user or client. Criteria may be defined that describes when a virtual machine has reached a ready-state. The criteria may be predefined or determined dynamically. The criteria may then be applied to a virtual machine during the process of initialization or execution to determine whether the virtual machine has reached its ready-state. The determination of whether a virtual machine has reached its ready-state may be done by a virtual machine manager, such as virtual machine manager 202.

At block 330, the virtual machine is paused based upon the determination of the ready-state. For example, virtual machine manager 202 may pause virtual machine 206 on virtual machine host 204 if the ready-state has been reached. Otherwise, the virtual machine may be allowed to continue to initialize or execute until the ready-state is reached. The virtual machine may be paused in a manner such that the virtual machine is inactive on the virtual machine host. The virtual machine's resources may still be loaded on the virtual machine host, even though the virtual machine may not be using any of the virtual machine host's processor resources.

At block 340, a request for the virtual machine is received from a client. A client, such as another computing device, may send a request for the virtual machine. For example, virtual machine host 204 may receive a request for virtual machine 206 from client 212. In some cases, the virtual machine host may have more than one virtual machine either active or paused on the virtual machine host. These multiple virtual machines may be in a virtual machine pool. In such cases, the request from the client may include additional information such as a hardware configuration and software configuration. This information may include any feature or setting related to either software or hardware that a virtual machine may be configured with. As a result, the virtual machine host may locate a matching virtual machine on a virtual machine host with the same or a better hardware configuration and software configuration.

Once the virtual machine is located, at block 350, the virtual machine matching the request is resumed on the virtual machine host. For example, virtual machine 206 may be resumed on virtual machine host 204. When a virtual machine is resumed, the virtual machine may become active on the virtual machine host. For example, the virtual machine may continue initializing, or if the virtual machine had already been initialized, it may accept connections or run particular processes. After the virtual machine has been resumed, the virtual machine host may perform some final configuration tasks, such as synchronizing the virtual machine's data with any data that has changed while the virtual machine was paused.

At block 360, a notification is sent to the client, wherein the notification specifies that the virtual machine is ready for use. The notification may be sent over a network, such as network 210. The notification may also include information that allows the client to access the now active virtual machine. For example, the notification may include information such as an IP address or a resolvable location such as a domain name service (DNS) address.

Figure 4:
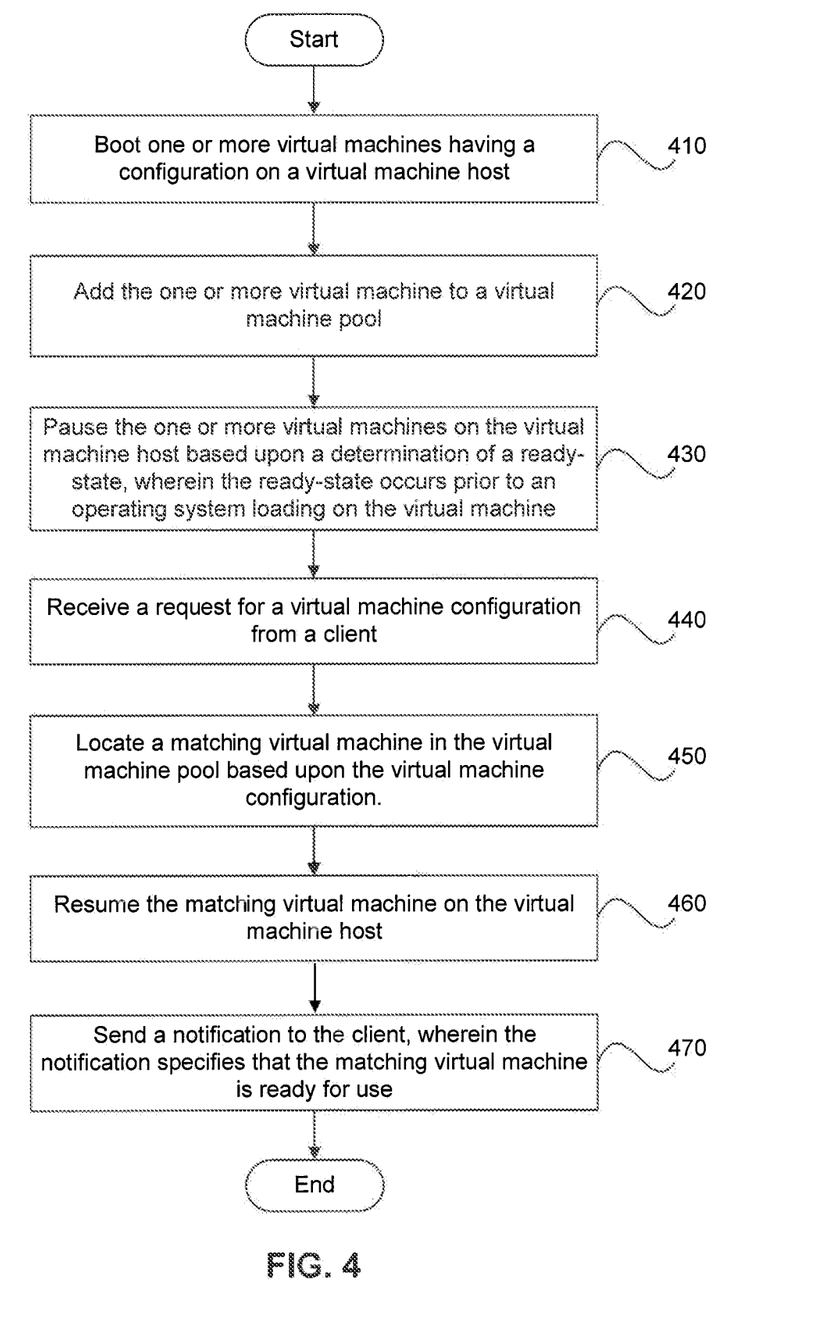
FIG. 4 is a flow diagram of a method for fast provisioning of virtual machines in a virtual machine pool, according to an embodiment.

FIG. 4 is a flow diagram of a method for fast provisioning of virtual machines in a virtual machine pool, according to an embodiment.

At block 410 of method 400, one or more virtual machines having a configuration are booted on a virtual machine host. For example, one or more virtual machines may be initialized on virtual machine host 204. The configuration may include hardware and software settings, for example, the number and type of processors, the amount memory or storage, or a software or hard drive image. Similar to method 300, the booting may occur in a manner similar to a physical computing device, except the commands may be processed by the virtual hardware. However, the virtual hardware corresponds to physical hardware on a physical computing device.

At block 420, the one or more virtual machines are added to a virtual machine pool. For example, virtual machine host 204 may have one or more virtual machine pools. The virtual machine pool may be a collection of virtual machines. In some cases the virtual machines may have related configurations, however, that may not be required. The virtual machine pool may also already have other virtual machines added to it. Those preexisting virtual machines may be active or inactive. The pool may keep track of the resources the virtual machines need to make sure they do not exceed the maximum number of resources that are available for the virtual machines. The virtual machine pool may also allow for requests for access to virtual machines in the virtual machine pool. The requests may include a requested configuration that specifies a particular hardware configuration and a particular software image. However, in some cases, the request may include only a software image setting, or hardware configuration, or the request may not include either. In such cases, default settings may be substituted in order to locate a suitable virtual machine. For example, if a request does not specify a hardware configuration, any virtual machine with any hardware configuration may be suitable, and thus, any virtual machine may be returned to the client. However, if configurations are specified, a matching virtual machine may be found in the virtual machine pool based upon the requested configuration. The virtual machine pool may also include virtual machines that are at various points of initialization. For example, some of the virtual machines may be paused (inactive) at a particular point, others may be running (active), while still others may be in different states.

At block 430, the one or more virtual machines are paused based upon a determination of the ready-state, wherein the ready-state occurs prior to the operating system loading on the virtual machine. For example, virtual machine manager 202 may pause one or more virtual machines in a virtual machine pool on virtual machine host 204. The ready-state may be placed at any point prior to the loading of the operating system. However, the particular point at which the ready-state is placed may depend on the particular hardware configuration and the context. For example, if the hardware takes a period of time to initialize the virtual storage devices during booting, the ready-state may be placed after the initialization of the hardware configuration. The ready-state may also be placed just prior to the loading of the operating system. The particular place to which the ready-state is set may depend on a number of circumstances, such as the particular hardware of the virtual machine and the virtual machine host as well as the intended use of the virtual machine. However, once the virtual machine has reached its ready-state, the virtual machine is paused. The pausing of the virtual machine may cause the virtual machine to be inactive on the virtual machine host, yet still have some of its resources loaded on the virtual machine host.

At block 440, a request for a virtual machine configuration is received from a client. The request may contain a hardware configuration and software configuration. For example, virtual machine host 204 may receive a request for a virtual machine configuration from client 212. The hardware configuration may specify the particular hardware the virtual machine is configured with, such as the number and types of processors, amount of memory, and amount of storage. The software configuration may specify the hard drive image or software image the virtual machine may load. This image may be a particular operating system configured with a particular set of software applications.

At block 450, a matching virtual machine is located in the virtual machine pool based upon the virtual machine configuration. The virtual machine pool may be searched for a complete virtual machine, which matches both the requested hardware configuration and the software configuration. For example, virtual machine manager 202 may search the virtual machine pool on virtual machine host 204 for a matching virtual machine configuration. If a complete virtual machine is not found, the virtual machine pool may be searched for a partial virtual machine. A partial virtual machine may be a virtual machine that matches the requested hardware configuration but not the requested software configuration. If a partial virtual machine is located, the software image may be switched out for the requested software image, thus enabling the partial virtual machine to match the requested software configuration. If neither a complete virtual machine nor a partial virtual machine may be located, then a new virtual machine may be created with the requested hardware and software configuration.

In some cases, the requested hardware and software configurations may be just a minimum required by the client. In such cases, a matching virtual machine may be a superset of the hardware configuration, the software configuration, or both. For example, a client may request a virtual machine with four gigabytes of memory and two processors, but the virtual machine pool may only have available virtual machines with eight gigabytes of RAM and four processors. Depending on the context, the virtual machine with eight gigabytes and four processors may be suitable to the client. Similarly, the software configuration may be a superset of the requested software configuration. For example, the requested version of the operating system may be lower or older than any of the virtual machines available in the virtual machine pool. However, in some cases, using a higher or newer version number may be suitable to the client. In some cases, however, the superset may not be suitable to the client. However, the located virtual machine may still be able to be modified in order to be suitable to the client. In particular, the located virtual machine that is a superset may be sliced in order to be suitable to the client. For example, if a client requests a virtual machine with four gigabytes of memory, but only a virtual machine with eight gigabytes of memory is found, the located virtual machine may be sliced to only have four gigabytes of memory. Accordingly, in an embodiment, a virtual machine which is a superset of the requested configuration may be used as the matching virtual machine.

If a matching virtual machine has been located, then at block 460, the matching virtual machine is resumed on the virtual machine host. If a virtual machine is resumed, the virtual machine may become active on the virtual machine host. For example, virtual machine manager 202 may resume the virtual machine on virtual machine host 204. In particular, if the ready-state was set prior to operating system initialization on the matched virtual machine, then the virtual machine may begin to load the operating system. However, if the virtual machine has a ready-state after operating system has initialized, the virtual machine may begin running processes in the operating system. The virtual machine host may also perform some final configuration tasks on the virtual machine after the virtual machine has been resumed.

At block 470, a notification is sent to the client, wherein the notification specifies that the matching virtual machine is ready for use. The notification may be sent over a network, such as network 210. The notification may also include information that allows the client to access the now active virtual machine. For example, the notification may include information such as an IP address or a resolvable location such as a domain name service (DNS) address.

Figure 5:
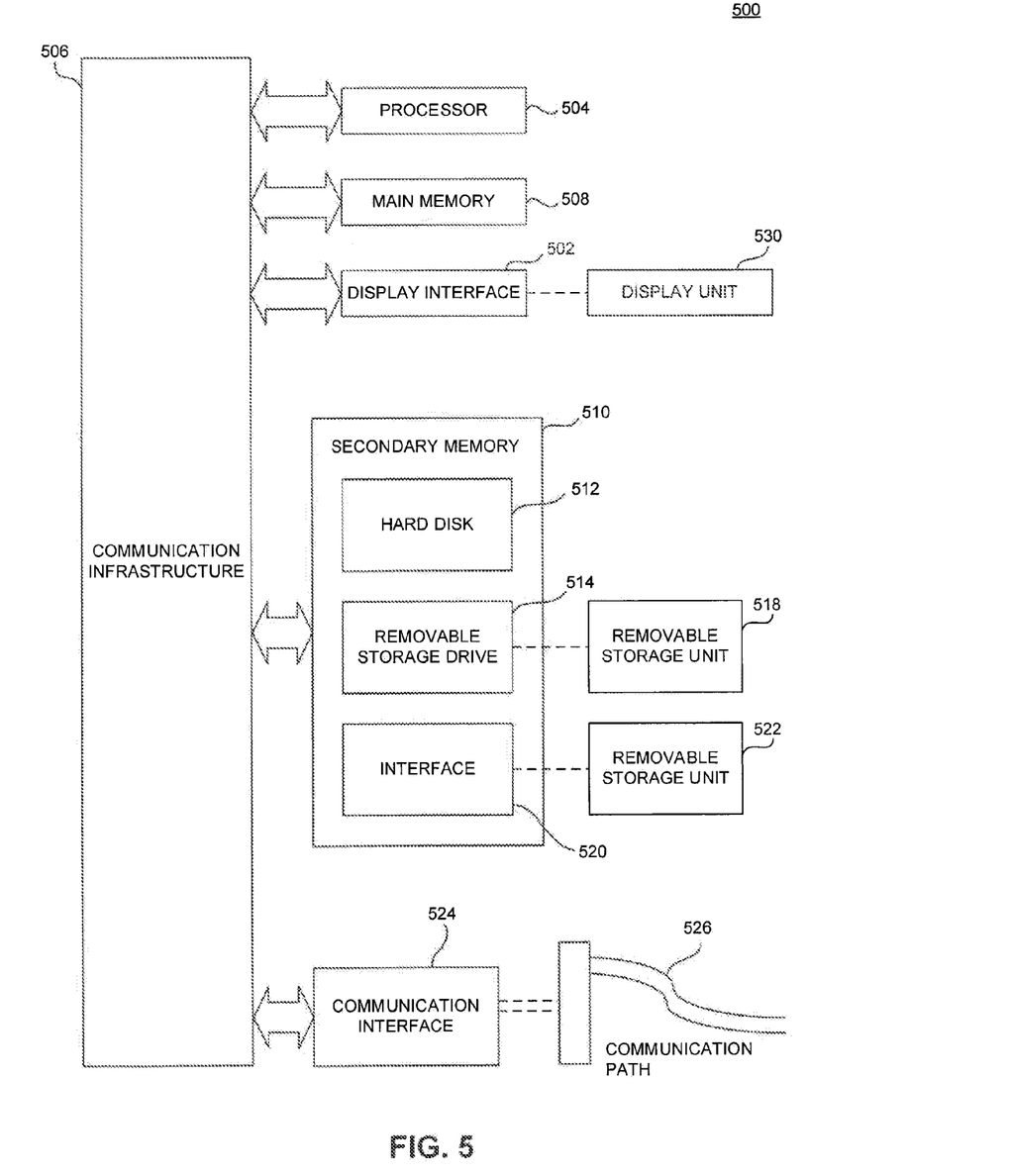
FIG. 5 illustrates an example computer system in which embodiments as described above, or portions thereof, may be implemented.

FIG. 5 illustrates an example computer system 500 in which embodiments as described above, or portions thereof, may be implemented. For example, system 300, including portions thereof, may be implemented in computer system 500 using hardware, software, firmware, tangible computer readable media having instructions stored thereon, or a combination thereof and may be implemented in one or more computer systems or other processing systems. Hardware, software, or any combination of such may embody any of the modules, procedures, and components in FIGS. 1-4.

One of ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device.

For instance, a computing device having at least one processor device and a memory may be used to implement the above-described embodiments. A processor device may be a single processor, a plurality of processors, or combinations thereof. Processor devices may have one or more processor "cores."

Various embodiments of the invention are described in terms of this example computer system 500. After reading this description, it will become apparent to a person skilled in the relevant art how to implement embodiments using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

As will be appreciated by persons skilled in the relevant art, processor device 504 may also be a single processor in a multi-core/multiprocessor system, such system operating alone, or in a cluster of computing devices operating in a cluster or server farm. Processor device 504 is connected to a communication infrastructure 506, for example, a bus, message queue, network, or multi-core message-passing scheme.

Computer system 500 also includes a main memory 508, for example, random access memory (RAM), and may also include a secondary memory 510. Secondary memory 510 may include, for example, a hard disk drive 512 and removable storage drive 514. Removable storage drive 514 may include a floppy disk drive, a magnetic tape drive, an optical disk drive, a flash memory, or the like. The removable storage drive 514 reads from and/or writes to a removable storage unit 518 in a well-known manner. Removable storage unit 518 may include a floppy disk, magnetic tape, optical disk, etc. which is read by and written to by removable storage drive 514. As will be appreciated by persons skilled in the relevant art, removable storage unit 518 includes a computer readable storage medium having stored thereon computer software and/or data, wherein storage media includes a floppy disk drive, a magnetic tape drive, an optical disk drive, a flash memory, or the like.

Computer system 500 (optionally) includes a display interface 502 (which can include input and output devices such as keyboards, mice, etc.) that forwards graphics, text, and other data from communication infrastructure 506 (or from a frame buffer not shown) for display on display unit 530.

In alternative implementations, secondary memory 510 may include other similar means for allowing computer programs or other instructions to be loaded into computer system 500. Such means may include, for example, a removable storage unit 522 and an interface 520. Examples of such means may include a program cartridge and cartridge interface (such as that found in video game devices), a removable memory chip (such as an EPROM, or PROM) and associated socket, and other removable storage units 522 and interfaces 520 which allow software and data to be transferred from the removable storage unit 522 to computer system 500.

Computer system 500 may also include a communications interface 524. Communications interface 524 allows software and data to be transferred between computer system 500 and external devices. Communications interface 524 may include a modem, a network interface (such as an Ethernet card), a communications port, a PCMCIA slot and card, or the like. Software and data transferred via communications interface 524 may be in the form of signals, which may be electronic, electromagnetic, optical, or other signals capable of being received by communications interface 524. These signals may be provided to communications interface 524 via a communications path 526. Communications path 526 carries signals and may be implemented using wire or cable, fiber optics, a phone line, a cellular phone link, an RF link or other communications channels.

Some embodiments may be directed to computer products having software stored on any computer readable storage medium. Such software, when executed in one or more data processing devices, causes the data processing device(s) to operate as described herein.

Certain embodiments may be implemented in hardware, software, firmware, or a combination thereof. Some embodiments may be implemented via a set of programs running in parallel on multiple machines.

The summary and abstract sections may set forth one or more but not all exemplary embodiments of the present invention as contemplated by the inventor(s), and thus, are not intended to limit the present invention and the appended claims in any way.

Embodiments of the present invention have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

What is claimed is:

1. A method for fast provisioning virtual machines in a computing system having at least one virtual machine host and a virtual machine manager, comprising:

booting, by the virtual machine manager, a plurality of virtual machines on one or more virtual machine hosts;

determining, by the virtual machine manager, when a booted virtual machine has reached a ready-state based upon at least one dynamically set criterion that defines a point, at any time prior to an operating system being loaded on a booted virtual machine when the virtual machine is ready for use;

in response to a determination that a booted virtual machine has reached a ready-state, pausing, by the virtual machine manager, the booted virtual machine, wherein the pausing comprises placing the virtual machine in an inactive state on the one or more virtual machine hosts;

receiving, by the virtual machine manager, a request for a virtual machine configuration from a client;

locating, by the virtual machine manager, a matching paused virtual machine on the one or more virtual machine hosts based upon the requested virtual machine configuration;

resuming, by the virtual machine manager, the matching paused virtual machine on the one or more virtual machine hosts in response to the request from the client; and sending, by the virtual machine manager, a notification to the client, wherein the notification specifies that the requested virtual machine is ready for use and includes information that allows the client to access the resumed virtual machine, said information including an IP address or a DNS address.

2. A system for managing virtual machines, comprising:
one or more virtual machine hosts configured to run one or more virtual machines; and
a virtual machine manager configured to cause one or more processors to:
  boot a plurality of virtual machines on the one or more virtual machine hosts,
  determine when a booted virtual machine has reached a ready-state based upon at least one dynamically set criterion that defines a point, at any time prior to an operating system being loaded on a booted virtual machine, when the virtual machine is ready for use,
  in response to a determination that a booted virtual machine has reached a ready-state, pause the booted virtual machine, wherein the pausing comprises placing the virtual machine in an inactive state on the one or more virtual machine hosts,
  receive a request for a virtual machine configuration from a client,
    locate a matching paused virtual machine on the one or more virtual machine hosts based upon the requested virtual machine configuration,
    resume the matching paused virtual machine on the one or more virtual machine hosts in response to the request from the client, and
    send a notification to a client, wherein the notification specifies that the requested virtual machine is ready for use and includes information that allows the client to access the resumed virtual machine, said information including an IP address or a DNS address.

3. The system of claim 2, wherein the client is connected to the at least one virtual machine host through a network.

4. A method for allocating a virtual machine in a computing system having at least one virtual machine host and a virtual machine manager, comprising:
  booting, by the virtual machine manager, one or more virtual machines having a configuration on a virtual machine host;
  adding the one or more booted virtual machines to a virtual machine pool;
  determining, by the virtual machine manager, when the one or more booted virtual machines has reached a ready-state based upon at least one criterion that defines a point, at any time prior to an operating system being loaded on a booted virtual machine, when the virtual machine is ready for use;
  in response to the virtual machine manager determining that the one or more booted virtual machines has reached a ready-state, pausing the one or more booted virtual machines on the virtual machine host;
  receiving, by the virtual machine manager, a request for a virtual machine configuration from a client, wherein the virtual machine configuration comprises:
    a hardware configuration, and
    a software configuration;
  locating, by the virtual machine manager, a matching paused virtual machine in the virtual machine pool based upon the requested virtual machine configuration;
  resuming, by the virtual machine manager, the matching paused virtual machine on the virtual machine host; and
  sending, by the virtual machine manager, a notification to the client, wherein the notification specifies that the matching virtual machine is ready for use.

5. The method of claim 4, wherein the locating a matching virtual machine in the virtual machine pool comprises:
  receiving, by the virtual machine manager, the hardware configuration from the request;
  receiving, by the virtual machine manager, the operating system type from the request;
  when a complete virtual machine is available, locating, by the virtual machine manager, a complete virtual machine in the virtual machine pool based upon the hardware configuration and the operating system configuration;
  when a complete virtual machine is not available, locating, by the virtual machine manager, a partial virtual machine in the virtual machine pool based upon the hardware configuration; and
  attaching, by the virtual machine manager, an operating system to the virtual machine based upon the operating system type and whether a complete virtual machine or a partial virtual machine has been located.

6. The method of claim 5, wherein locating a complete virtual machine based upon the hardware configuration and the operating system type comprises:
  locating, by the virtual machine manager, a complete virtual machine in the virtual machine pool which matches the hardware configuration or is a superset of the hardware configuration; and
  locating, by the virtual machine manager, a complete virtual machine in the virtual machine pool which matches the operating system configuration or is a superset of the operating system configuration.

7. The method of claim 5, wherein locating a partial virtual machine in the virtual machine pool comprises locating a partial virtual machine in the virtual machine pool which matches the hardware configuration or is a superset of the hardware configuration.

8. The method of claim 4, wherein the client is connected to the virtual machine host through a network.

9. A non-transitory computer-readable storage medium, having instructions stored thereon that, when executed by one or more computers, cause the one or more computers to perform operations comprising:
  booting a plurality of virtual machines on one or more virtual machine hosts;
  determining when a booted virtual machine has reached a ready-state based upon at least one dynamically set criterion that defines a point, at any time the prior to an operating system being loaded on a booted virtual machine when the virtual machine is ready for use;
  in response to a determination that a booted virtual machine has reached a ready-state, pausing the booted virtual machine, wherein the pausing comprises placing the booted virtual machine in an inactive state on the one or more virtual machine hosts;
  receiving a request for a virtual machine configuration from a client;
  locating a matching paused virtual machine on the one or more virtual machine hosts based upon the requested virtual machine configuration;
  resuming the matching paused virtual machine on the one or more virtual machine hosts in response to the request from the client; and
  sending a notification to a client, wherein the notification specifies that the requested virtual machine is ready for use and includes information that allows the client to access the resumed virtual machine, said information including an IP address or a DNS address.

* * * * *